(No Model.)

C. D. LYON.
CAR BRAKE HANDLE.

No. 491,969. Patented Feb. 14, 1893.

Witnesses.
Louis N. Dowell
Maurick L. Emery

Inventor.
Charles D. Lyon
by Crosby & Gregory
Attys.

UNITED STATES PATENT OFFICE.

CHARLES D. LYON, OF LYNN, ASSIGNOR OF ONE-HALF TO HARRY A. FISHER, OF SWAMPSCOTT, MASSACHUSETTS.

CAR-BRAKE HANDLE.

SPECIFICATION forming part of Letters Patent No. 491,969, dated February 14, 1893.

Application filed October 24, 1892. Serial No. 449,868. (No model.)

*To all whom it may concern:*

Be it known that I, CHARLES D. LYON, of Lynn, county of Essex, State of Massachusetts, have invented an Improvement in Car-Brake Handles, of which the following description, in connection with the accompanying drawings, is a specification, like letters and figures on the drawings representing like parts.

This invention relates to and has for its object to improve and simplify that class of brake handle wherein when the brake handle is turned in one direction it will turn the brake rod, and in the opposite direction will slip and not turn the brake rod.

In my improvements, I have aimed to produce a handle such that the usual lost motion when moved in the direction to rotate the brake rod is obviated, and I have also provided a handle and co-operative hub and clutch of great strength and durability, and which may be cheaply and quickly applied to or removed from the brake rod without disembodiment of the parts.

In my invention, the upper end of the brake rod is provided with a screw thread upon which is screwed a hub having cam surfaces located above a shoulder thereof, and having an upwardly extended annularly grooved bearing for the body of the handle, the handle having an enlarged shell to embrace the hub and a series of rolls, the shell being lined to enable it to be made more durable, stronger, and lighter.

Figure 1:
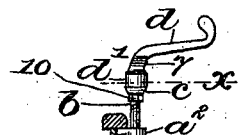
Figure 3:
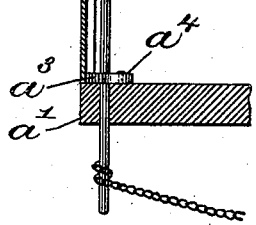
Figure 3:
Figure 2:
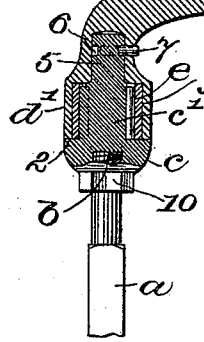

Figure 1, shows part of a car platform with a brake rod provided with my improved handle. Fig. 2, an enlarged sectional detail of the handle; and Fig. 3, a section in the line $x$, Fig. 1, much enlarged.

The brake rod $a$, has its bearings in the car platform $a'$ and at $a^2$, and the rod has attached to it a ratchet wheel $a^3$ adapted to be engaged by a detent $a^4$ made as a pawl under the control of the driver or motor man. The upper end of the brake rod is provided with a screw thread $b$, upon which is screwed firmly the hub $c$ provided at its lower end with a tapped or threaded hole to engage said threads. The hub is reduced in diameter to constitute a shoulder 2, and the part $c'$ next above the shoulder is provided with a series of inclines 3, 3, terminated by shoulders 4, 4, bored to constitute spring seats, and above the inclines the said hub is reduced in diameter to constitute a bearing 5 for the handle $d$, the said bearing having an annular groove 6 near its upper end for the entrance of a suitable screw or pin 7 by which to connect the handle loosely to the hub.

The handle has at one end an enlarged shell $d'$ which is extended down over the hub to substantially the shoulder 2, so as to surround the inclined faces 3, and from between the inner side of the shell and the hub a series of tapering ended openings for the reception of a series of cylindrical rolls $e$ acted upon by springs $e'$ resting in said spring seats, said springs normally acting to keep the rolls pressed in contact with the shell on one side and the hub on the other side, so that, unlike a pawl, the said rollers will constantly be in clutch so as to enable the rotation of the brake shaft $a$, to be started at once and without any lost motion when the handle is turned.

It is a great desideratum to make the entire movement of the handle $d$ effective when the operator, having hold of it is moving the handle in the direction to put on the brake, as frequently the loss of a second or two results in the loss of life or injury to the person. By providing the shell with a lining $f$ of steel or hard metal, the shell is made stronger and more durable.

The lower end of the hub $c$ is made with several flat sides 10, so that when putting it upon or removing it from the brake rod $a$ wrench may be used to advantage.

My improved device may be readily applied to any brake rod by simply cutting a screw thread on its upper end.

I do not claim broadly to be the inventor of rolls to co-operate with other devices and form a clutch, as such rolls have been made the subject of claim as improvements in various mechanical structures.

When the detent is released from the ratchet on the rod, the brake rod will be rotated backwardly in usual manner, and the handle will be turned with it.

Having described my invention, what I claim, and desire to secure by Letters Patent, is—

1. The self-contained clutch handle for car brakes, the same consisting of the screw-threaded hub provided with a shoulder, and above it a series of inclined faces and above it a bearing 5 for the handle, combined with a handle having an enlarged shell-like end to embrace the portion of the hub having the inclined faces down to the shoulder 2, and a series of cylindrical rolls interposed between the shell and hub, and a device to loosely connect the handle with the bearing 5 to operate, substantially as described.

2. The self-contained clutch handle for car brakes, the same consisting of the screw-threaded hub provided with a shoulder and above it a series of inclined faces and above it a bearing 5 for the handle, combined with a handle having an enlarged shell-like end provided with a lining, as $f$, to embrace the portion of the hub having the inclined faces down to the shoulder 2, a series of cylindrical rolls interposed between the shell and hub, and a device to loosely connect the handle with the bearing 5 to operate, substantially as described.

3. The self-contained clutch handle for car brakes, the same consisting of the screw-threaded hub provided with a shoulder and above it a series of inclined faces and above it a bearing 5 for the handle, combined with a handle having an enlarged shell-like end to embrace the portion of the hub having the inclined faces down to the shoulder 2, a series of cylindrical rolls interposed between the shell and hub, a device to loosely connect the handle with the bearing 5, said hub having a series of spring holders, and a series of springs to normally keep the said rollers into the contracted ends of the spaces between the hub and the interior of the shell, substantially as described.

4. The brake rod provided with a threaded upper end and having the feed ratchet, combined with the hub provided with a shoulder, and above it a series of inclined faces and above it a bearing 5 for the handle, and with a handle having an enlarged shell-like rod to embrace the portion of the hub having the inclined faces down to the shoulder 2, a series of cylindrical rolls interposed between the shell and hub, and a device to loosely connect the handle with the bearing 5, to operate, substantially as described.

In testimony whereof I have signed my name to this specification in the presence of two subscribing witnesses.

CHARLES D. LYON.

Witnesses:
GEO. W. GREGORY,
EMMA J. BENNETT.